United States Patent [19]

Manning et al.

[11] 3,730,141
[45] May 1, 1973

[54] PET FEEDER

[75] Inventors: Jim L. Manning, Seaside; Richard D. Manning, San Jose, both of Calif.

[73] Assignee: John M. Klein, Winter Park, Fla., part interest

[22] Filed: Mar. 30, 1972

[21] Appl. No.: 239,472

Related U.S. Application Data

[63] Continuation-in-part of Ser. No. 106,697, Jan. 15, 1971, abandoned.

[52] U.S. Cl. ................119/51.5, 119/52 R, 119/77
[51] Int. Cl. ..........................A01k 5/00, A01k 7/00
[58] Field of Search ..................119/51.5, 52 R, 53, 119/53.5, 77

[56] References Cited

UNITED STATES PATENTS

| | | | |
|---|---|---|---|
| 886,806 | 5/1908 | Hoffmann | 119/52 R |
| 1,096,703 | 5/1914 | Fleurg | 119/53.5 |
| 2,111,190 | 3/1938 | McGuire | 119/51.5 |

*Primary Examiner*—Hugh R. Chamblee
*Attorney*—Ben J. Chromy et al.

[57] ABSTRACT

A unitary portable pet feeder which has two storage removable containers, one of which holds a predetermined quantity of water and the other of which holds a supply of dry pet food. The water and dry food containers feed water and dry food automatically into compartments of a tray to which they are attached. The forward parts of the tray are open so as to be accessible to the pet. This feeder may be easily disassembled for periodic cleaning.

2 Claims, 4 Drawing Figures

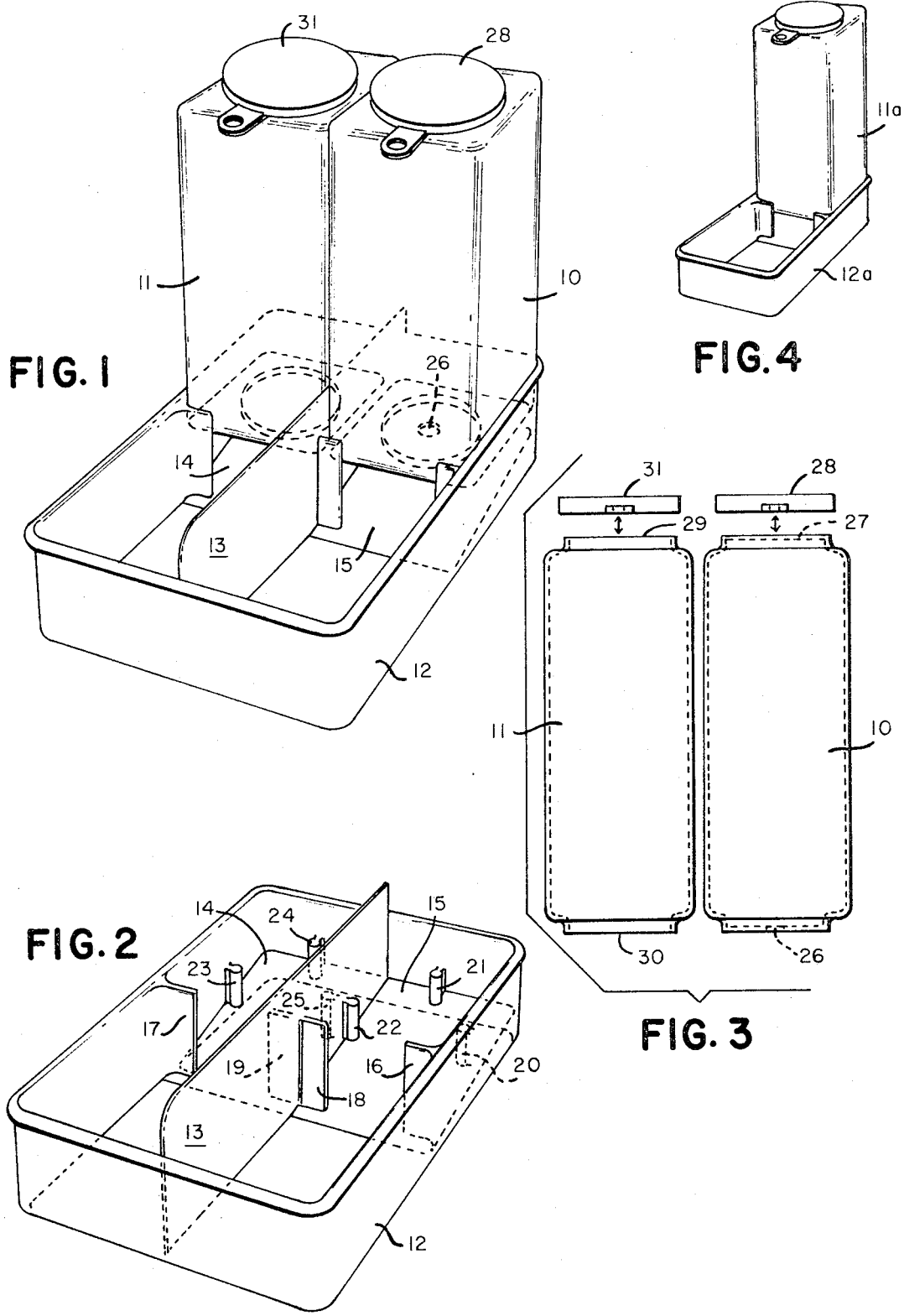

PET FEEDER

This application is a continuation-in-part of our application Ser. No. 106,697 for PET FEEDER filed Jan. 15, 1971, now abandoned.

DESCRIPTION OF THE INVENTION

This invention relates to a unitary portable water-ing and feed device for pets.

An object of this invention is to provide an improved pet watering and feeding device which is constructed to hold either a predetermined quantity of water or a quantity of dry pet food, the water or dry food being fed automatically to open water and food containers so as to be accessible to the pet, said device being constructed so that it is easy to clean.

Another object of this invention is to provide an improved pet watering and feeding device which is provided with a water storage compartment and a dry food storage compartment, said compartments being made of transparent panel material, such as plastic, so that the amount of water and dry food therein may be visible from the outside, said compartments also being constructed so that they automatically feed water and dry food therefrom into open containers which are accessible to the pet.

Another object of this invention is to provide an improved pet watering and feeding device that is provided with two vertically disposed storage chambers which are fitted into a tray that functions as a receptacle for water and food supplied thereto from said storage chambers by gravity.

Other and further objects of this invention will be apparent to those skilled in the art to which it relates from the following specification, claims and drawing.

In accordance with this invention there is provided an improved pet feeding device which has two compartments, one of which is made to receive water and the other of which is made to receive the dry food. These compartments are made of transparent or translucent sides and the compartments are individually fitted into a tray in inverted position so that the contents of the compartments are fed by gravity into the tray. The open tops of the compartments are provided with individual covers which are adapted to seal the tops of the compartments to reduce exposure to air of the contents. The compartments are also constructed so that they may be easily cleaned simply by removing the covers therefrom and flushing the interior thereof with water and suitable detergents.

Other features and details of construction of this device will be set forth in the following specification, claims and drawing in which:

FIG. 1 is a perspective view of an embodiment of this invention;

FIG. 2 is a perspective view of the tray with the storage containers removed;

FIG. 3 is a side view of the individual water and food compartments; and

FIG. 4 is a view of a single storage container and tray unit.

Referring to the drawing in detail, FIG. 1 shows a pet feeding and watering device of this invention having a water container 10 and a solid food container 11 supported by the tray 12. The water compartment 10 and the dry food compartment 11 are separate containers made of plastic by the blow molding process or the like. The tray 12 is also preferably made of plastic and this tray is provided with an integral partition 13 which divides the tray into two compartments, one of these compartments may be referred to as the dry food compartment and the other may be referred to as a water compartment. The rear portions of these compartments are provided with inclined bottoms 14 and 15, respectively.

Inclined bottom 14 is positioned under the dry food storage chamber 11 and inclined bottom 15 is positioned under the water storage chamber 10. These inclined bottoms are made integral with the side walls, rear wall and partition of the tray 12. The bottom portions of the water container 10 and dry food container 11 are made of sizes such that they frictionally fit into the portion of the tray 12 provided for receiving these bottom portions, so that these containers can not be easily dislodged and tipped over by the pet feeding from the tray.

The tray 12 is provided with panel members 16 and 17, and the partition 13 is provided with panel members 18 and 19 which extend into the tray compartments and frictionally engage the storage containers. Thus when the water container 10 is positioned in the tray, upper side portions of the panels 16 and 18 frictionally engage lower parts of the water container and also when the dry food container is placed on the tray the upper side portions of panels 17 and 19 frictionally engage the lower parts of this container. The tray 12 is also provided with pillars 20 to 25, inclusive, which are made integral therewith and which support the storage containers. Thus, the water container 10 is supported by the pillars 20, 21 and 22 when this container is placed into the tray. Likewise, when the dry food container 11 is placed into the tray it is supported by the pillars 23, 24 and 25.

The bottom of the water container 10 is provided with a small hole 26 and the top of this container is completely sealed by the member 27 which is adapted to be covered by the plastic cap 28 that frictionally engages the periphery of the container top. The container 10 is supplied with water by removing this container from the tray 12 and inserting a small water hose into the hole 26 while the container is held with this hole uppermost. The water compartment of the tray 12 is then filled with water from the same hose until the water level therein reaches the level normally occupied by the bottom of the water container 10. The filled water container is then positioned into the tray as shown in FIG. 1. While the container 10 is being positioned into the tray 12 the hole 26 may be temporarily plugged by a suitable cork or by a person's finger so that too much of the water does not leak out of this container during this positioning operation. Water is then fed from container 10 into the tray when water is removed from the tray so that the water level therein drops low enough to permit some air to enter the container through hole 26. The level of water in the tray is then raised and flow of air into the container interrupted.

The dry food container is provided with a top opening 29 as well as a bottom opening 30. Thus, this container may be supplied with dry food while the container is in position on the tray 12 simply by pouring the dry food into the container through the top opening 29. The dry food leaves this container through the bottom opening 30 and slides down into the tray 12 over the inclined bottom 14 and some of the dry food tumbles down this incline to the forward part of the tray where it is readily accessible to the pet. A cover 31 made of plastic or similar material is provided to seal the top of the dry food container 11. This cover frictionally engages the vertical wall around the top opening 29.

In FIG. 4 there is shown an embodiment in which the tray 12a is made of a size such as to receive only one container 11a. The container 11a may be either a water container or a dry food container and in either case it is constructed the same as the containers shown in FIGS. 1 and 3. Thus, if container 11a is to be used for water and it is constructed the same as container 10 and if it is to be used for dry food then it is constructed the same as container 11. Container 11a is supported in the tray 12a by suitable pillars such as the pillars 20–25. Container 11a also frictionally engages selected tray walls and panels extending into the tray 12a so as not to be readily tipped over by the pet feeding from the tray.

Dry food placed into the dry food container 11 through the hole 29 in the top thereof drops out of this container through the bottom hole 30 upon the inclined bottom 14 and slides down this inclined bottom into the open feeding part of the tray where it is accessible to the pets. As the pets remove the food from the feeding tray additional food slides down the inclined bottom 14 until the supply in the dry food container is exhausted. The open fronts of the water compartment and dry food compartment of the tray extend to the front of the vertical containers 10 and 11. Thus, these open fronts may be inserted into a hole in a wall of a kennel apartment occupied by a pet so that the water and food exposed in these open fronts are accessible to the pet. In this case the water and dry food storage compartments are positioned on the outside of the kennel apartment.

While we have shown and described a preferred form of the invention it is apparent that the invention is capable of variation and modification from the form shown so that the scope thereof should be limited only by the proper scope of the claims appended hereto.

What we claim is:

1. A unitary portable pet feeder comprising the combination of a tray having a bottom, said tray also having front, back and side walls attached to said bottom, a portion of said bottom being inclined from said back wall toward the center of said tray, removable food storage container means, said container means frictionally engaging said back wall and portions of said side walls above said inclined bottom portion, said tray having a plurality of inwardly extending means, selected ones of said means frictionally engaging the front of said storage container means to prevent forward movement of said container means with respect to said tray and selected ones of said means engaging the bottom of said storage container means to support said container means in said tray, said container means having means through which food is supplied to said tray therefrom.

2. A unitary portable pet feeder comprising the combination as set forth in claim 1, further characterized in that said means frictionally engaging the front of said container means comprising panels integral with walls of said tray and said support means comprising pillars integral with said tray.

* * * * *